(12) United States Patent
Das et al.

(10) Patent No.: US 7,738,422 B2
(45) Date of Patent: Jun. 15, 2010

(54) INTERFERENCE-REDUCING METHOD OF FORWARD LINK SCHEDULING FOR WIRELESS NETWORKS

(75) Inventors: Suman Das, Scotch Plains, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1229 days.

(21) Appl. No.: 11/210,038

(22) Filed: Aug. 23, 2005

(65) Prior Publication Data

US 2007/0047569 A1 Mar. 1, 2007

(51) Int. Cl.
*H04W 4/00* (2009.01)

(52) U.S. Cl. .............. 370/330; 370/281; 370/329; 370/344; 370/478; 370/319

(58) Field of Classification Search ........... 370/443, 370/210, 208, 209, 203, 281, 330, 329, 344, 370/478, 319
See application file for complete search history.

(56) References Cited

U.S. PATENT DOCUMENTS

| | | | |
|---|---|---|---|
| 6,334,057 B1 * | 12/2001 | Malmgren et al. | 455/450 |
| 6,356,531 B1 * | 3/2002 | Soliman | 370/241 |
| 6,765,969 B1 * | 7/2004 | Vook et al. | 375/259 |
| 6,904,283 B2 * | 6/2005 | Li et al. | 455/450 |
| 6,922,547 B2 * | 7/2005 | O'Neill et al. | 455/17 |
| 6,982,987 B2 * | 1/2006 | Cain | 370/442 |
| 6,999,760 B2 * | 2/2006 | Dhainaut | 455/422.1 |
| 7,042,857 B2 * | 5/2006 | Krishnan et al. | 370/329 |
| 7,139,274 B2 * | 11/2006 | Attar et al. | 370/395.4 |
| 7,373,150 B2 * | 5/2008 | Cho et al. | 455/447 |
| 7,392,054 B2 * | 6/2008 | Cho et al. | 455/447 |
| 7,522,924 B2 * | 4/2009 | Abeta et al. | 455/450 |
| 2002/0019233 A1 * | 2/2002 | Leung et al. | 455/447 |
| 2003/0012174 A1 * | 1/2003 | Bender et al. | 370/347 |
| 2003/0123425 A1 * | 7/2003 | Walton et al. | 370/341 |
| 2003/0142658 A1 * | 7/2003 | Ofuji et al. | 370/349 |
| 2003/0181163 A1 * | 9/2003 | Ofuji et al. | 455/25 |
| 2003/0193908 A1 * | 10/2003 | Cain | 370/330 |
| 2003/0227889 A1 * | 12/2003 | Wu et al. | 370/335 |
| 2004/0028018 A1 * | 2/2004 | Cain | 370/338 |
| 2005/0169229 A1 * | 8/2005 | Cho et al. | 370/344 |
| 2006/0002360 A1 * | 1/2006 | Ji et al. | 370/343 |
| 2006/0111110 A1 * | 5/2006 | Schwarz et al. | 455/439 |

* cited by examiner

*Primary Examiner*—Ricky Ngo
*Assistant Examiner*—Dewanda Samuel
(74) *Attorney, Agent, or Firm*—Martin I. Finston (57) ABSTRACT

A method of scheduling and sub-channelization is provided for a wireless network such as an OFDMA network. Distributed coordination is applied across sectors, such neighboring sectors will tend to schedule cell-edge users at the same time, while sub-channelizing to different portions of the full frequency band available for forward link transmissions. This tendency is achieved by dividing each sector's users into user classes which depend upon forward link channel quality. Each user class is assigned a different set of priorities for use of available timeslots and subcarriers.

10 Claims, 12 Drawing Sheets

PRIOR ART

| SE/DRC | 3.0 | 2.5 | 2.0 | 1.5 | 1.25 | 1.0 | 3/4 | 1/2 | 1/4 | 1/8 | 1/16 | 1/32 |
|---|---|---|---|---|---|---|---|---|---|---|---|---|
| Target SINR | 14.0 | 12.2 | 9.4 | 7.7 | 4.8 | 3.1 | 1.4 | -1 | -4 | -7 | -9.9 | -12.6 |
| Sub-channelization | 1 | 1 | 1 | 1 | 1 | 1 | 1 | 3/4 | 1/2 | 1/3 | 1/3 | 1/3 |
| Slot Priority | 1 | 1 | 1 | 1 | 1 | 1 | 2 | 2 | 3 | 3 | 4 | 4 |

| Parameter | | Assumptions |
|---|---|---|
| Cell Layout | | 19 cell 3 sector clover-leaf with wraparound |
| Inter site distance | | 1km |
| Path loss model | | $L = 120.9 + 37.6 \log_{10}(R)$ |
| Shadowing | | Lognormal 8dB std. dev |
| Correlation | Inter cell | 0.5 |
| | Inter sector | 1 |
| Penetration loss | | 10dB |
| Carrier freq/bandwidth | | 900MHz/1.25MHz |
| UE speeds | | 10Kmph |
| BS transmit | | Single antenna 43dBm |
| Rx type | | Single antenna receive |
| Rx antenna gain | | 0dB |
| Rx noise figure | | 9dB |
| Users per sector | | 20 |
| Channel model | | Single path Rayleigh |

INTERFERENCE-REDUCING METHOD OF FORWARD LINK SCHEDULING FOR WIRELESS NETWORKS

FIELD OF THE INVENTION

This invention relates to methods of forward link scheduling in wireless communication networks.

ART BACKGROUND

It is a common problem in wireless communications that users situated relatively far from the base station that serves them are generally most susceptible to interference from neighboring base stations and to signal attenuation. As a consequence, such users may experience relatively low signal-to-interference-and-noise ratios (SINRs).

Below, we will refer to the relatively distant users as "cell-edge users" or as users with "poor geometry." It will be understood that when one user is said to be more "distant" from the base station than another, what is meant does not depend solely on geographical distance, but also to susceptibility to other factors leading to attenuation and interference.

Various strategies may be used to keep the error rates at an acceptable level in the data received by such relatively distant users. Such strategies typically involve some sacrifice of spectral efficiency in order to keep error rates low. For example, coding rates may be reduced, or sub-channelization techniques may be employed to concentrate power in a limited portion of the full available frequency band.

It is typical of such strategies that they are implemented independently by the various base stations. However, coordination across cells or across sectors may improve efficiencies achieved with strategies such as sub-channelization. There remains a need for appropriate approaches to coordination of this kind.

SUMMARY OF THE INVENTION

We have found a useful way to sub-channelize with distributed coordination across sectors. In our approach, neighboring sectors will tend to schedule cell-edge users at the same time, while sub-channelizing to different portions of the full frequency band available for forward link transmissions. This tendency is achieved by dividing each sector's users into user classes which depend upon forward link channel quality. Each user class is assigned a different set of priorities for use of available timeslots and subcarriers.

DETAILED DESCRIPTION

Our approach is particularly applicable to OFDMA systems. More generally, it may be applied in multichannel CDMA systems and other multichannel wireless systems.

Those skilled in the art will understand that a base station may serve a cell of a wireless network as a single, integral geographical unit, or the cell may be subdivided into sectors which are served independently of one another. We will use the term "reception area" to denote the smallest independent geographical unit served by a base station. Thus, depending on the specific circumstances, a reception area may be a cell, or it may be a sector or other geographical unit. In the following discussion, cells will be referred to in some places, and sectors in others. Such terminology should not be understood as limiting, because the principles to be described below may be applied irrespective of whether the pertinent reception area is a cell, a sector, or some other geographical unit.

Those skilled in the art will understand further that various formats for wireless communication include a relatively long time window which is subdivided into shorter time windows during each of which, for example, one user is served. Without limitation, we will adopt the term "frame" to denominate such a longer time window, and the term "slot" or "timeslot" to denominate the shorter time window. In particular, our use of the term "timeslot" encompasses "subframes" as a specific example.

Figure 1:
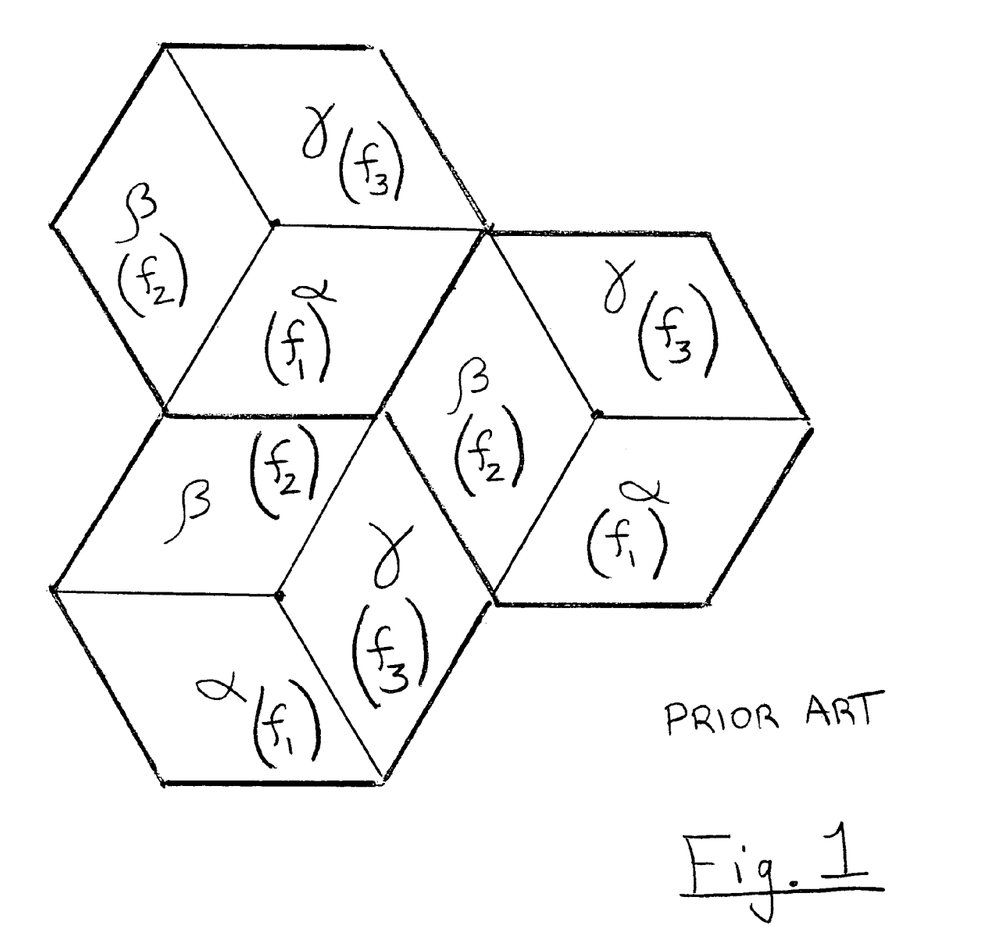
FIG. 1 is a schematic diagram of a 1:3 reuse pattern as known in the art.

It is known that reuse patterns, such as the 1:3 reuse pattern of FIG. 1, are useful for reducing interference between neighboring sectors. As seen in FIG. 1, each cell of a network is divided, according to a 1:3 reuse pattern, into respective $\alpha$, $\beta$, and $\gamma$ sectors. The three classes of sectors are geographically distributed in such a way that, ideally, two sectors of the same class do not share a common edge. As a consequence, interference can be reduced by assigning mutually disjoint sets of subcarriers to the respective sector classes. In such a situation, the three sector classes may be said to be "mutually orthogonal" with respect to their use of subcarriers. In the figure, the respective sets of subcarriers are denoted $f_1$, $f_2$, and $f_3$.

We introduce the term "reuse group" to denote a group of base stations (together with the users they serve), each chosen such that its zone of reception overlaps the reception zones only of base stations in other reuse groups. Stated simply, the reuse pattern partitions the base stations into reuse groups such that neighboring base stations must belong to distinct reuse groups. Thus, in the example of FIG. 1, the base stations serving the $\alpha$, $\beta$, and $\gamma$ sectors belong to distinct reuse groups. In this context, a base station serving, e.g., three independent sectors should be regarded as three independent base stations.

In certain implementations of our approach, we use a similar type of reuse pattern. However, subcarriers are not allocated to sector classes in a rigid manner. Instead, the respective sets of subcarriers are placed in a priority ordering which is different for each sector class. Thus, each sector class has a highest priority for a respective one of, e.g., $f_1$, $f_2$, and $f_3$.

Within a given timeslot, a scheduled user may be allocated a full set, or only a partial set, of subcarriers, depending on its reported channel condition. The priority rule for subcarriers is applied such that the first available subcarriers to be claimed by the given user are those for which its own sector has highest priority.

Figure 2:
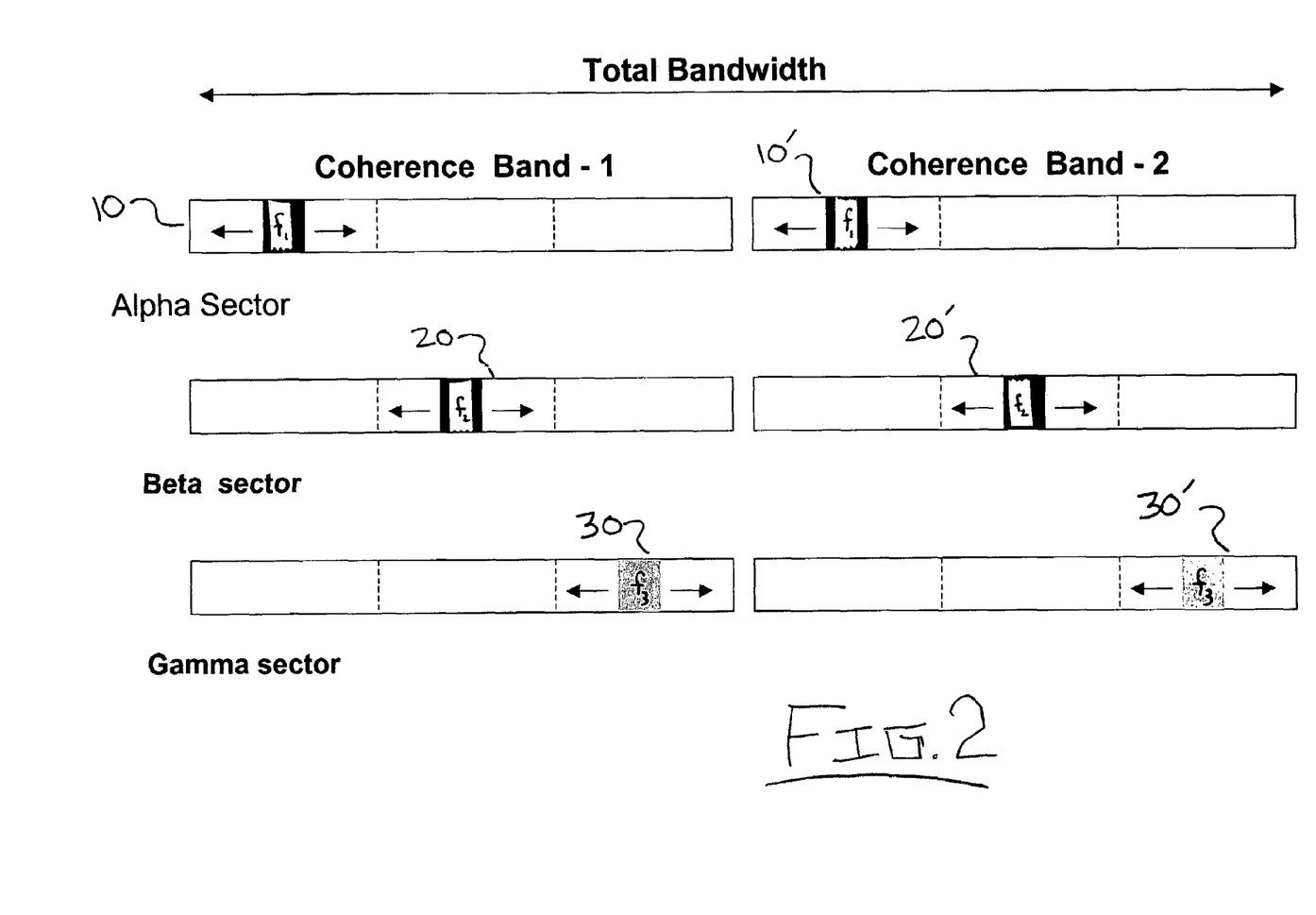
FIG. 2 is a schematic diagram illustrating sector-based subcarrier priorities as described below.

Thus in FIG. 2, for example, reference numerals 10, 10' denote those portions of the frequency spectrum for which α sector has priority, numerals 20, 20' denote those for which β sector has priority, and numerals 30, 30' denote those portions for which γ sector has priority.

Those skilled in the art will understand that in the example of FIG. 2, transmission is being made in multiple coherence bands for diversity gain. Subcarrier priorities may be assigned in one, two, or more such bands without departing from the principles described here.

In certain implementations of our approach, timeslots are also made subject to a priority ordering. As noted, the priority ordering for subcarriers is different for different sectors. (It will be understood that in other implementations, the reuse pattern is best described in terms of cells instead of sectors.) By contrast, the priority ordering for timeslots is the same for all sectors (or cells). Within a frame, the timeslots have a priority ordering for each user that is dependent on the user's channel quality. The user may use any of various indicators, such as DRC, CQI, or SE, to report channel quality. More generally, any indicator based on the SINR may be used. For simplicity, however, we will use the DRC as an example in the following discussion. However, the possible use of alternative indicators is not excluded. (Those skilled in the art will recognize that DRC—"data rate control"—is a measure of the forward link channel quality which is fed back to the network by the user.)

Our ordering of subcarriers and timeslots leads to two generally beneficial effects: Distant users (relative to their respective base stations) occupying adjacent sectors (or cells) will tend to be served at the same time but in different subcarriers. On the other hand, nearby users (relative to their respective base stations) will tend to be served by all available subcarriers in all sectors (or cells) at the same time.

Figure 3:
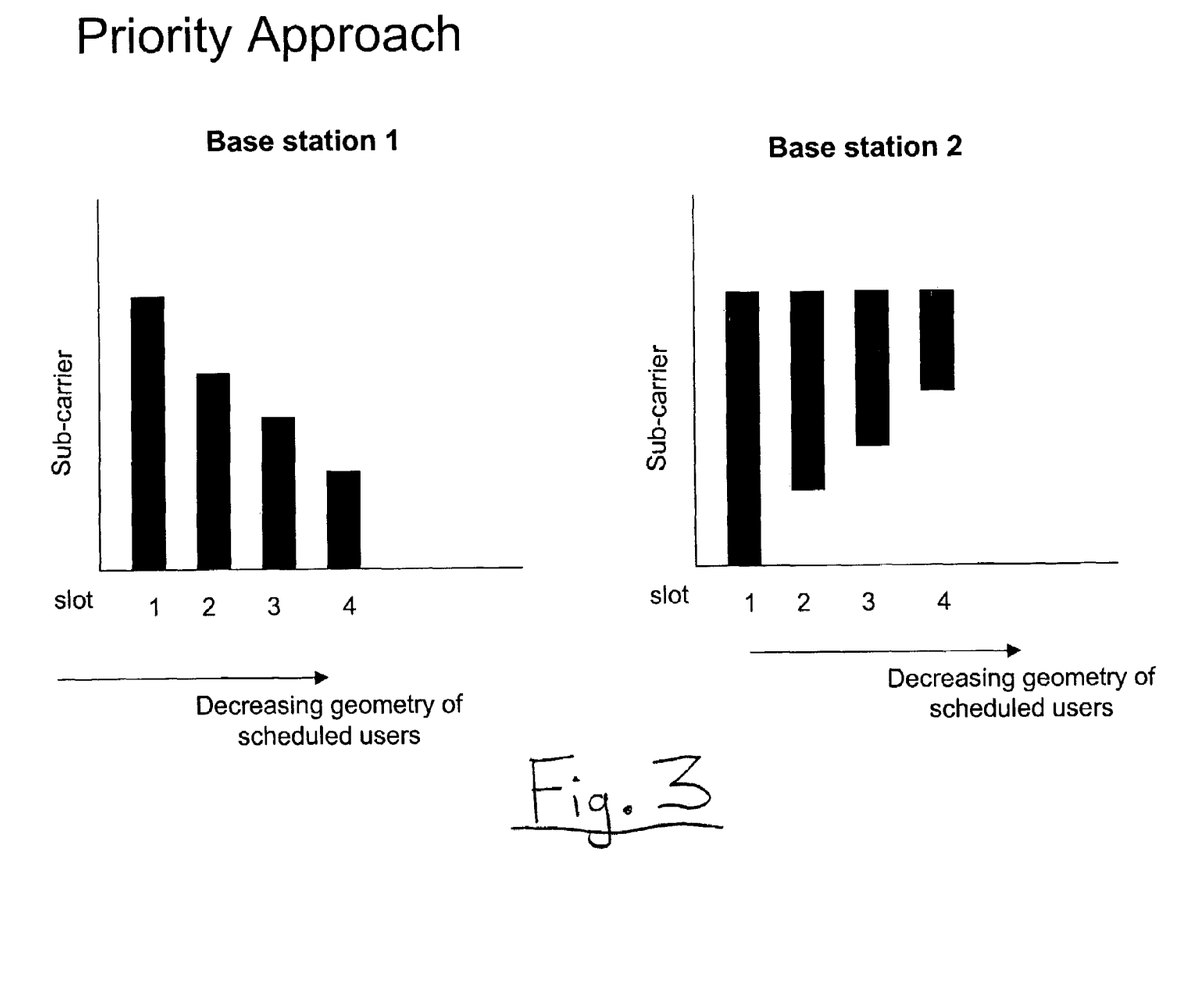
FIG. 3 is a simplified plot showing bandwidth utilization versus time for two neighboring sectors which are scheduled with distributed coordination as described below.

Such a situation is illustrated by FIG. 3. As will be seen, a frame of four successive timeslots is represented on the horizontal axis. The various subcarriers are distributed along the vertical axis. Users having "decreasing geometry" are scheduled in successively later timeslots. "Decreasing geometry" means increasing effective distance from the serving base station.

As seen in the figure, those users having the best channels are served in the first time slot. All subcarriers are used in both the first and the second cell. In successive timeslots, however, successively fewer subcarriers are used in each cell. Moreover, the use of overlapping subcarriers decreases. In the fourth timeslot, the respective cells are mutually orthogonal in their use of subcarriers.

We have devised a practical scheduling algorithm that combines, e.g., well-known proportional fair scheduling with our new concept of dynamic slot-based priority scheduling. More generally, other scheduling algorithms, such as token queue based equal throughput, or maximally fair, scheduling may be substituted in place of proportional fair scheduling.

Users are divided into several user classes, depending on each user's channel quality. For example, four such classes, here denominated "DRC regions" may be defined by respective ranges for the DRC values reported by the users. At each timeslot, each of, e.g., the four DRC regions corresponds to a certain slot priority. The priority ordering may be different for each slot position in a frame. The available subcarriers also have a priority ordering in each timeslot.

In certain implementations of our scheduling approach, the users are ranked in each slot, based on, e.g., their respective proportional fair scheduling weights. The users are also ranked based on their respective slot priorities. That is, each user is assigned a rank based on the priority of its DRC region at the pertinent slot position in the frame. Then, the two types of rank are combined by, e.g., forming a weighted sum. Which user to schedule is dictated by the relative values of the resulting composite ranks.

Figure 4:
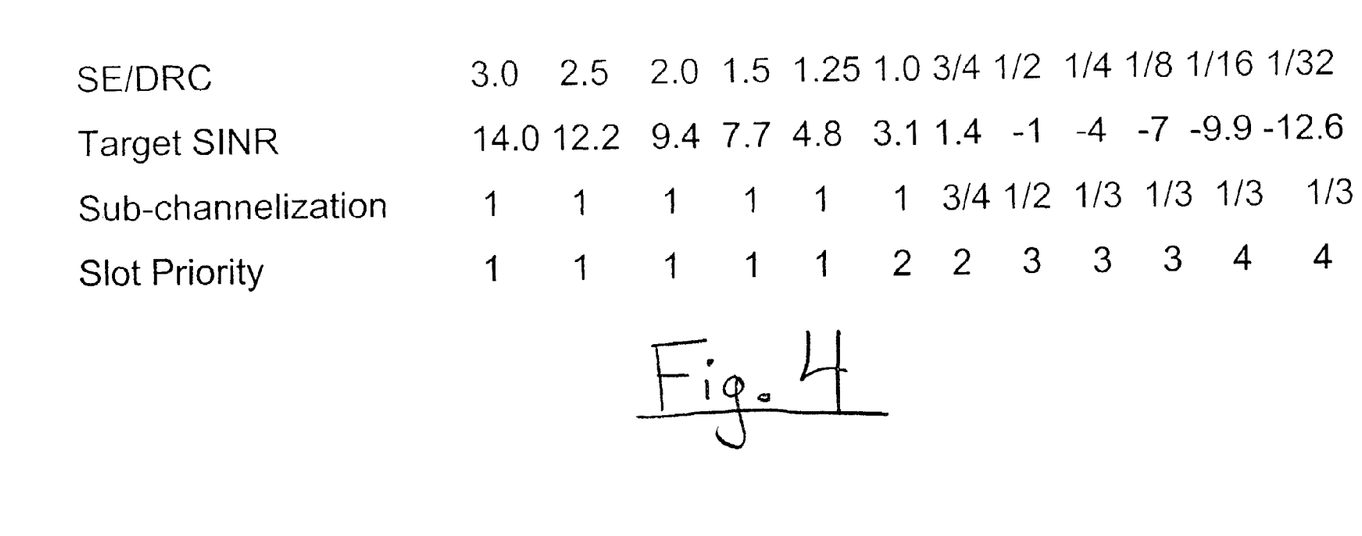
FIG. 4 is a table showing a mapping of channel quality to user classes for determination of slot priorities in an illustrative implementation of our method.
Figure 5:
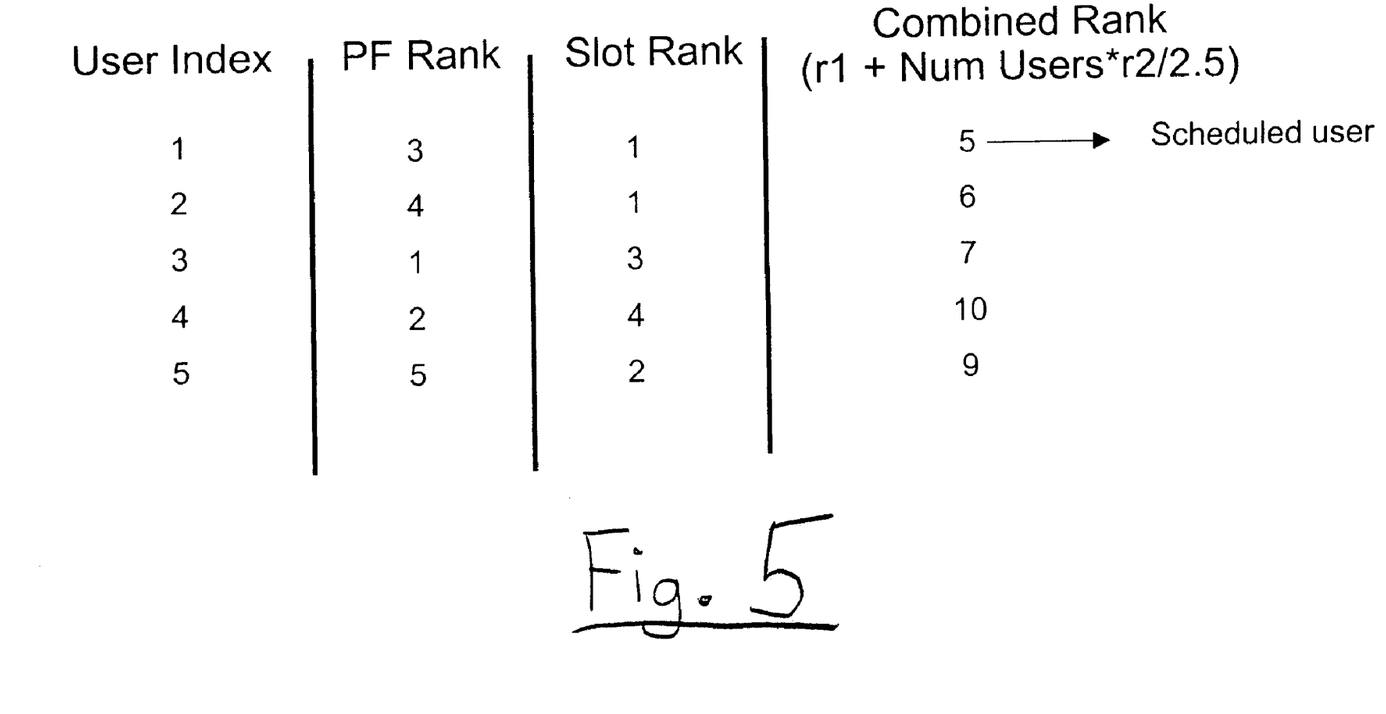
FIG. 5 is a table illustrating a scheduling method in which proportional fair scheduling is modified to include slot priorities according to our new method.

FIGS. 4 and 5 provide an example of the scheduling approach described above, in a particular implementation. As seen in FIG. 4, an exemplary channel quality indicator, here denoted "SE/DRC", ranges from 3.0 down to $\frac{1}{32}$. The range 3.0-1.25 is given slot priority 1, the range 1.0-¾ is given slot priority 2, the range ½-⅛ is given slot priority 3, and the range $\frac{1}{16}$-$\frac{1}{32}$ is given slot priority 4. Each SE/DRC value is also assigned a sub-channelization factor, not necessarily determined by DRC region. Thus in FIG. 4, for example, those users with SE/DRC in the range 3.0-1.5 have sub-channelization factor 1; i.e., the full range of subchannels may be grabbed by these users if they are scheduled. Those users with SE/DRC of 1.0 and ¾ have sub-channelization factors of ¾ and ½, respectively, indicating a proportional reduction in the bandwidth that may be grabbed. Similarly, those users with SE/DRC in the range ¼-$\frac{1}{32}$ have a sub-channelization factor of 1;3.

As noted, the slot priorities are different for different slot positions within the frame. For example, if there are four distinct DRC regions and four timeslots in a frame, the priorities in respective timeslots might be assigned according to the following table:

|  | Timeslot: | | | |
| --- | --- | --- | --- | --- |
| DRC Region: | Slot 1 | Slot 2 | Slot 3 | Slot 4 |
| 1 | 1 | 2 | 3 | 4 |
| 2 | 2 | 1 | 3 | 4 |
| 3 | 3 | 4 | 1 | 2 |
| 4 | 3 | 4 | 2 | 1 |

FIG. 5 illustrates the computation of the composite rank for the timeslot corresponding to FIG. 4. Each of five users populating an exemplary cell (or sector) is identified by a respective User Index. The second column of the figure lists the proportional fair rank for each user. The third column lists the corresponding slot rank for each user, computed as described above. The fourth column lists the composite rank, as computed from the formula, Composite Rank=(proportional fair rank)+(slot rank)×
(number of users)/2.5.

It will be understood that the above formula is presented purely for illustration and is not meant to be limiting.

In the example of FIG. 5, it will be seen that the smallest composite rank is 5, belonging to the user having user index 1. Accordingly, user 1 will be scheduled and will grab the bandwidth dictated by its sub-channelization factor.

As noted above, our coordination scheme is distributed, and is not centralized. As a consequence, the base station transmitting into a given sector does not know which subcarriers will be used at the same time by other base stations for transmission into neighboring sectors. Thus, the amount of interference cannot be predicted. Therefore, it is not possible for the base station to select exactly the optimal transmission rate. If the base station selects a transmission rate too optimistically, data may be lost. On the other hand, if the base station selects too conservatively, throughput may be unduly limited.

One solution is to employ the well-known Hybrid-ARQ protocol based on incremental redundancy. In alternate implementations, protocols of other types may be used instead. In Hybrid-ARQ, the base station transmits at a relatively low code rate. In the event that significant interference is present, the user will request a retransmission which provides additional redundancy, making it possible to recover corrupted data. On the other hand, if interference is successfully being avoided, there will be relatively few retransmission requests, and throughput will be enhanced.

Unequal distribution of a given sector's users among the different types of slot priority may have undesirable consequences. For example, proportional fairness cannot be guaranteed if some slot-priority user classes are significantly more populous than others.

One possible solution to this problem is to classify users according to a time-averaged indicator of channel quality, and to make the classification in such a way that roughly equal numbers of users are assigned to each class. For example, such an indicator might be the DRC, averaged over, e.g., the last twenty timeslots.

Another possible solution is referred to here as "look-ahead scheduling." In that approach, scheduling decisions are not made in every slot, but instead are made periodically with a period of several, e.g. four, slots. Thus, in an example with a period of four slots, scheduling decisions are made only once per four slots, based on current DRC values. To select a user for scheduling, a group of high-ranking users are selected based solely on their proportional fair ranks. The size of the group should be somewhat greater than the scheduling period. If the period is four, for example, the six highest ranking users might be selected.

Then, the slot priorities of the selected high-ranking users are considered. Users from the high-ranking group are assigned to respective slots according to their slot priorities. If multiple users from the group have the same slot priority, the proportional fair ranking may be used to determine which user shall be chosen. If no user has priority for a given slot, the next best user may be chosen for that slot.

Figure 6:
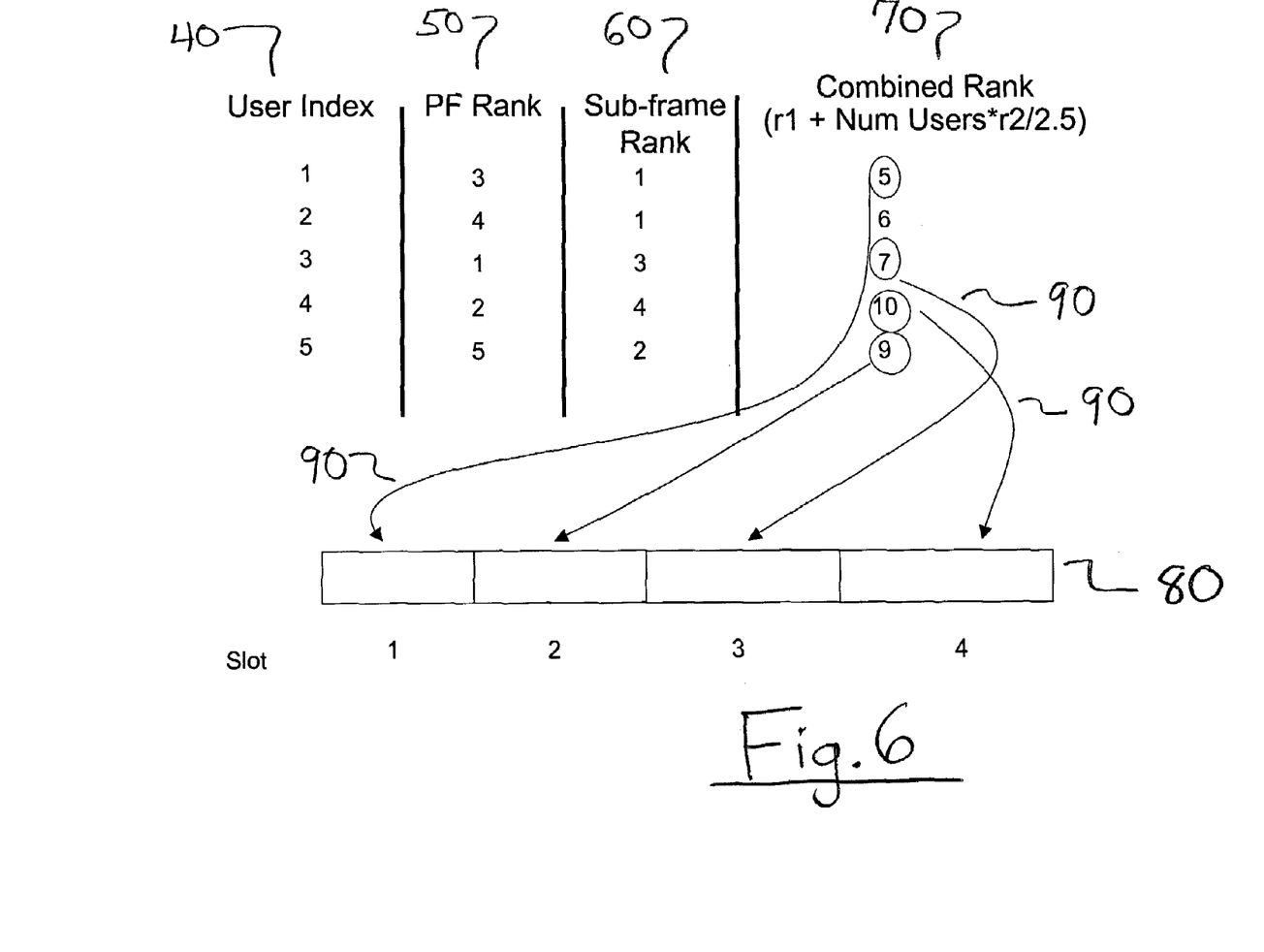
FIG. 6 is partly a table and partly a conceptual drawing illustrating a variation of the scheduling method of FIG. 5.

In a refinement of the procedure described above, a weight is used in place of slot priorities. An appropriate weight may be derived from the proportional fair weight and from the slot ranking. Such a procedure is illustrated by FIG. 6. As seen in the figure, each of five users is identified by a respective user index in column 40. Each user has a respective proportional fair rank as tabulated in column 50, and a respective slot rank (or "sub-frame rank") as tabulated in column 60. The composite rank for each user is tabulated in column 70. As indicated by the arrows 90, each of the four highest-ranked users is scheduled for a respective one of the four timeslots (or sub-frames) of frame 80.

Figure 7:
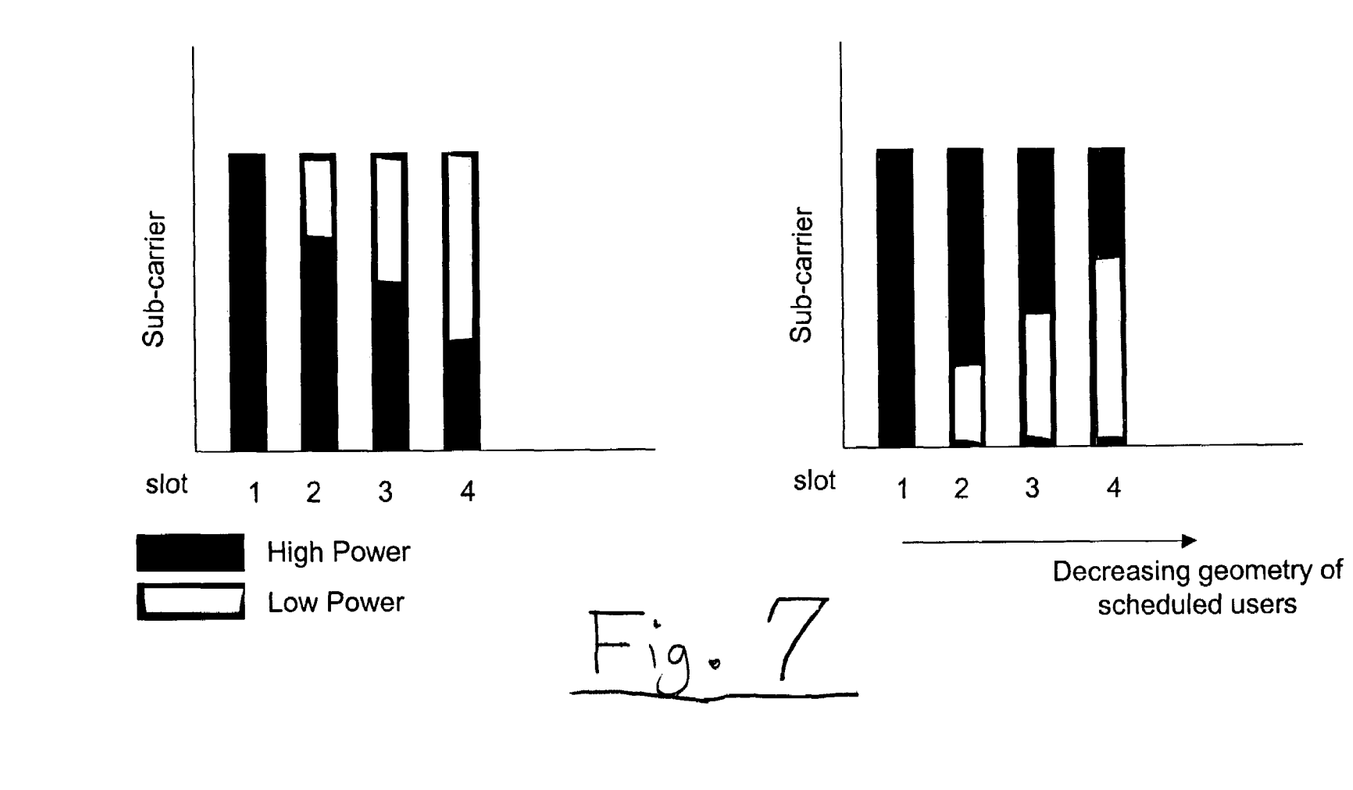
FIG. 7 is a simplified plot showing bandwidth utilization versus time for two neighboring sectors which are scheduled with distributed coordination as described below, in an alternate implementation which permits simultaneous transmission to multiple users.

FIG. 7 illustrates a variation of the approach described above, in which more than one user can be scheduled in a given slot. The key to accommodating multiple users is proper power control. That is, total transmit power is allocated between high-power subcarriers and low-power subcarriers. Low power is reserved for low-priority subcarriers but good-geometry users. With increasing distance between user and base station, the figure shows neighboring cells becoming more orthogonal with respect to the high-power subcarriers, but less orthogonal with respect to the low-power subcarriers. This is possible because low transmit power involves a correspondingly low risk of intercell interference. Such a dual-power approach enhances efficiency by making use of bandwidth which would otherwise be idle.

Retransmission, e.g. according to Hybrid-ARQ, may be used in the dual power scheme described above. In such a case, it is advantageous to constrain the low-power user such that it can receive retransmissions only so long as the high-power user is receiving retransmissions. Such a constraint can prevent retransmission operations from unduly burdening the scheduler.

In regard to retransmission, it should also be noted that in a protocol such as Hybrid-ARQ, a packet transmitted at a certain slot position of a frame will be retransmitted in the corresponding slot position of the next frame. The scheduling procedure described above is advantageously applied only to slots in which a retransmission has not been scheduled, so as not to interfere with the operation of the retransmission protocol.

It may sometimes happen that a lightly loaded sector adjoins a heavily loaded sector. In such a situation, system performance will benefit if the idle timeslots in the lightly loaded sector can be made to coincide with timeslots in which the heavily loaded base station is serving cell-edge users in the heavily loaded sector. This provides an extra opportunity to avoid interference in the lightly loaded cell while making maximum use of available bandwidth in the heavily loaded cell.

One way to bring about such an arrangement is to define a superframe of several, e.g. three, ordinary frames. A rule is defined, which governs the scheduling of empty slots. According to such a rule, each of the sector classes, such as the classes α, β, and γ discussed above, is assigned a different priority ordering for the scheduling of empty timeslots. Thus, for example, for scheduling empty timeslots in frame 1 of the superframe, class α has priority 1, class β has priority 2, and class γ has priority 3. For scheduling empty timeslots in the other frames of the superframe, these respective priorities are appropriately permuted.

It will be understood that the scheduling procedures we have described above are readily repeated in multiple frequency bands which, e.g., are mutually orthogonal, so that multiple users can be served simultaneously in their respective frequency bands. In this context, a frequency "band" may be a band, a sub-band, or even a non-contiguous collection of frequency subchannels.

Figure 8:
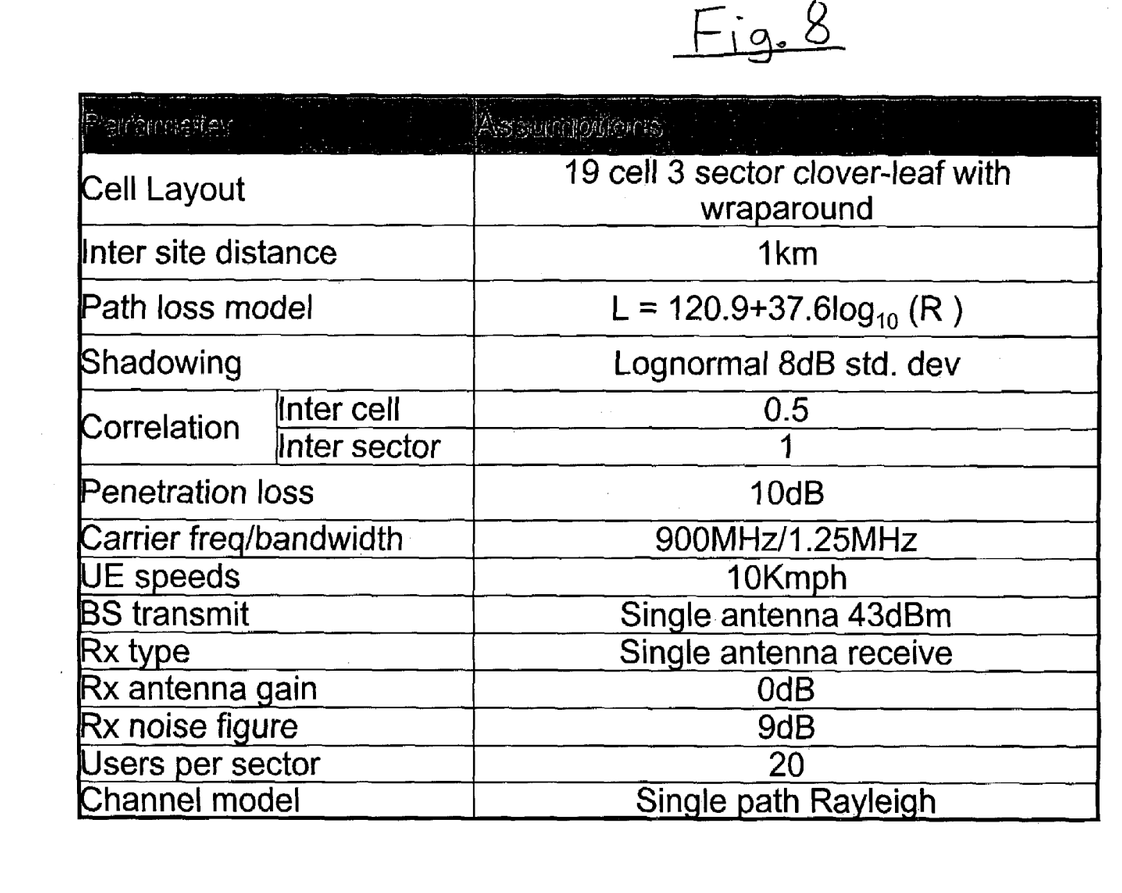
FIG. 8 is a table listing the parameters used in the simulations which led to FIGS. 7-10.

We performed numerical simulations to test our new scheduling approach. FIGS. 9-12 show the results of some of our simulations. The simulation parameters are listed in FIG. 8. The simulations were performed according to 3GPP RAN Work Group 1 simulation methodology. Hybrid-ARQ was used in all cases represented in the figures.

In each of FIGS. 9-12, a cumulative distribution function (CDF) is plotted versus spectral efficiency. The left-hand curve in each figure represents the baseline case, without coordination. The right-hand curve represents coordination according to our new approach as described above.

Figure 9:
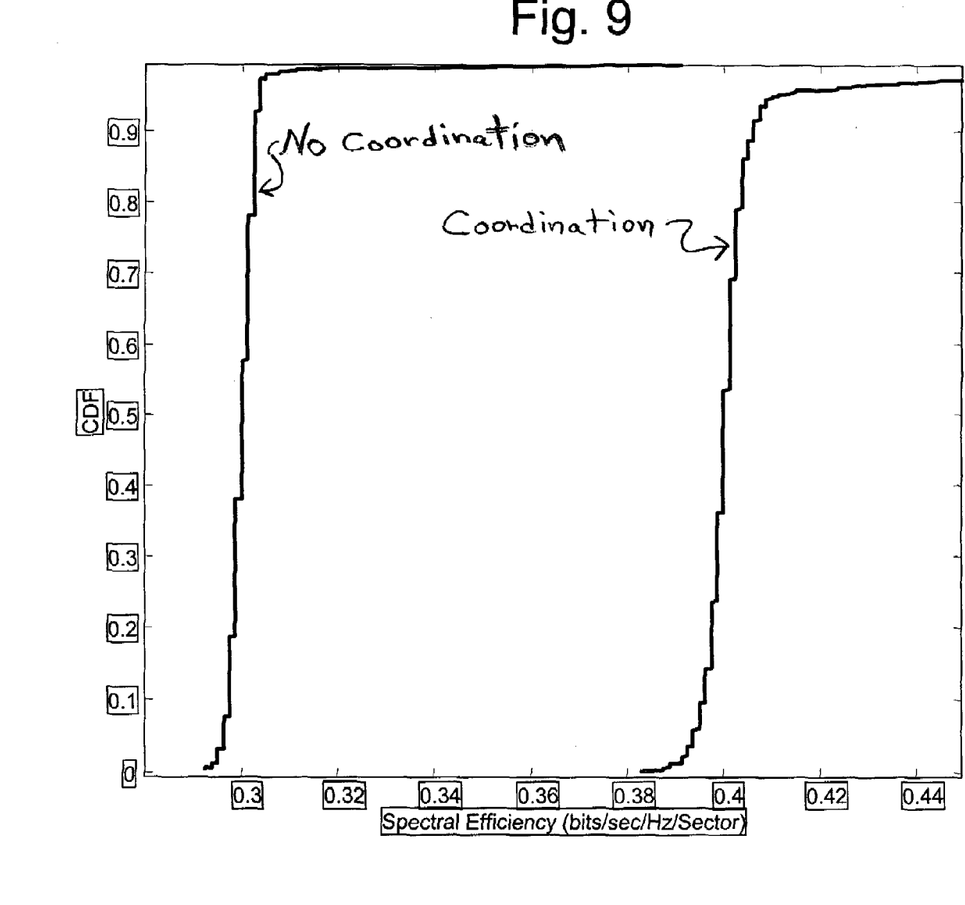
FIGS. 9-12 are plots of the statistical distribution of spectral efficiency over a population of users, according to computational simulations comparing our new approach with conventional scheduling approaches without coordination.

FIG. 9 shows comparative results, limited to cell-edge users, using maximally fair, token queue-based scheduling. It will be seen that coordination leads to an improvement in spectral efficiency of about 33%.

Figure 10:
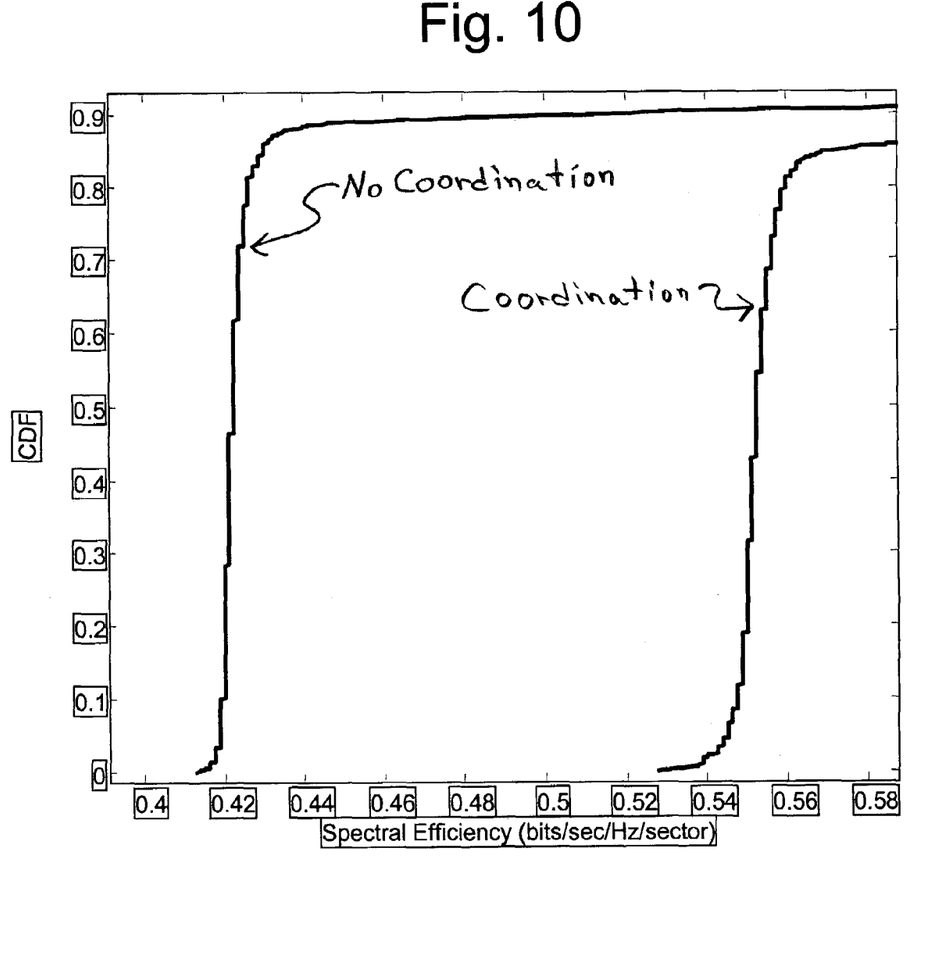

FIG. 10 shows comparative results for a uniform distribution of users across the cell, using the scheduling discipline of FIG. 7. It will be seen that coordination leads to an improvement in spectral efficiency of about 30%.

Figure 11:
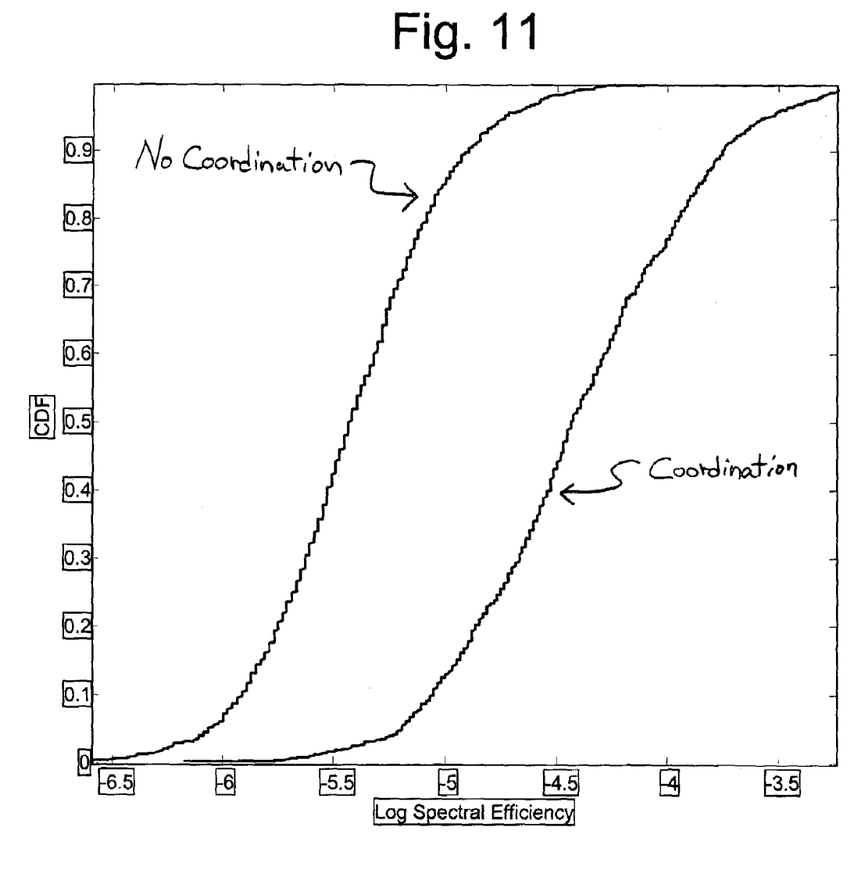

FIG. 11 shows comparative results, limited to cell-edge users, using proportional fair scheduling. It will be seen that coordination leads to an improvement in spectral efficiency of about 25%.

Figure 12:
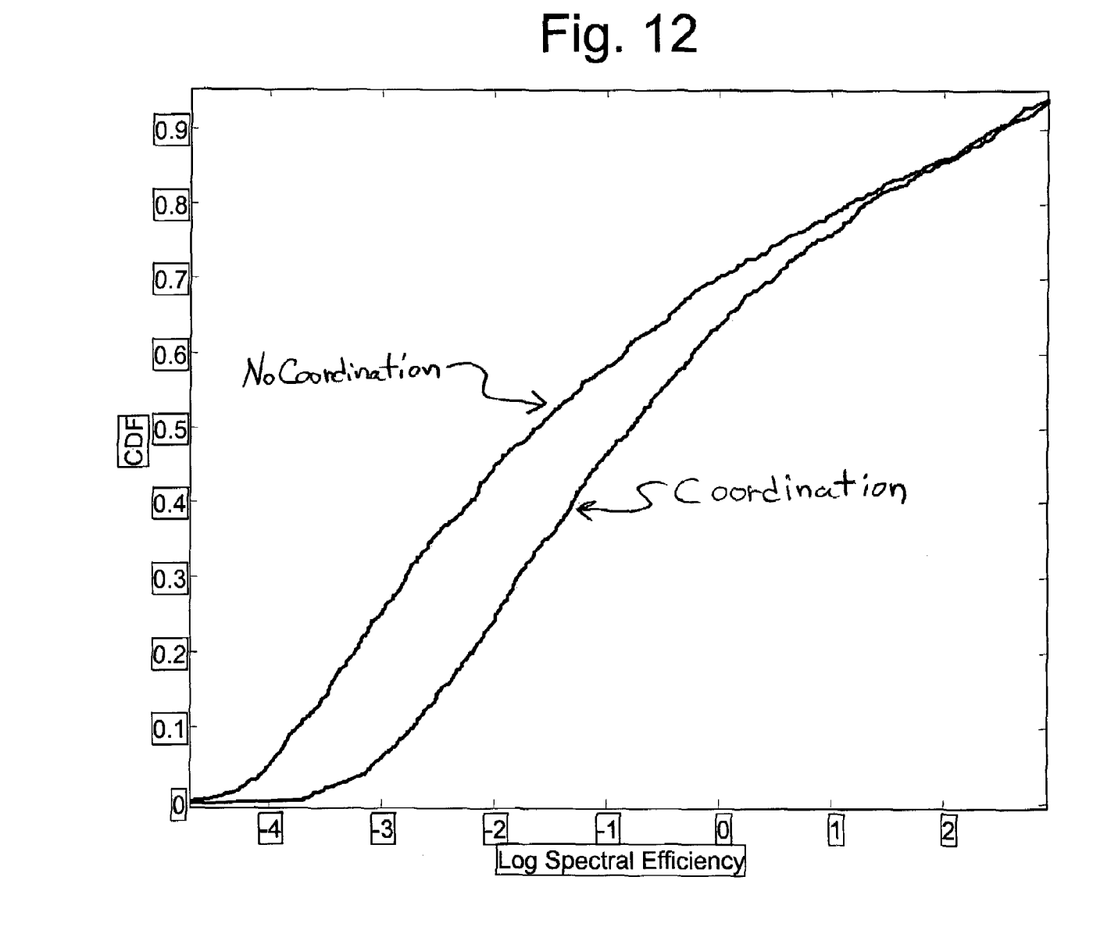

FIG. 12 shows comparative results for a uniform distribution of users across the cell, using the scheduling discipline of FIG. 9. It will be seen that at the 20% CDF level, the gain is about 25%.

We claim:

1. A method of scheduling users in a reception area of a wireless communication network to receive transmissions from a base station during a sequence of timeslots, comprising:
   (a) assigning, to each of at least some users in the reception area, a different slot priority for each timeslot in the sequence, wherein the slot priorities are based at least in part on indications of channel quality such that users having channels of similar quality tend to have their respective highest slot priorities fall in the same timeslot;
   (b) assigning to each of at least some said users a scheduling priority for each said timeslot, wherein each scheduling priority is based in part on the corresponding slot priority and is based in part on a fairness criterion; and
   (c) at the base station, scheduling a user in each said timeslot according to the scheduling priorities of the respective users for that timeslot;
   wherein the reception area is one of a group of mutually neighboring reception areas belonging to distinct frequency reuse groups, and the slot priorities are assigned in the same way in all reception areas that belong to said neighbor group.

2. The method of claim 1, further comprising assigning transmission frequencies to each scheduled user, wherein:
   each reuse group is allocated a distinct set of frequencies; and
   the scheduled users are assigned transmission frequencies according to a priority ordering in which frequencies allocated to their own reuse group take precedence.

3. The method of claim 2, wherein transmission frequencies allocated to other reuse groups are assigned preferentially to users having relatively high channel quality.

4. The method of claim 2, carried out so as to schedule a primary user in each timeslot of said timeslot sequence, and further comprising:
   scheduling at least one secondary user in at least one timeslot of said timeslot sequence and assigning to the secondary user at least some transmission frequencies allocated to other reuse groups for transmission thereon at a lower power than used for transmission to the primary user.

5. The method of claim 4, wherein the scheduling of secondary users is carried out preferentially for users having relatively high channel quality.

6. The method of claim 1, wherein the scheduling priorities are based in part on a proportional fair scheduling weight.

7. The method of claim 1, wherein the scheduling priorities are based in part on a token queue based equal throughput scheduling weight.

8. The method of claim 1, carried out with respect to a first frequency band so as to schedule at least one user in each said timeslot for transmission thereto in said first frequency band, and further carried out with respect to one or more additional frequency bands so as to schedule at least one further user in each said timeslot for transmission thereto in each of said one or more additional frequency bands.

9. The method of claim 1, wherein users having relatively poor channel quality are preferentially scheduled for timeslots in which at least one other reception area belonging to the neighbor group is preferentially scheduling empty timeslots.

10. The method of claim 9, wherein said at least one other reception area is scheduling empty timeslots according to a set of priorities for leaving slots empty.

* * * * *